United States Patent [19]
Green

[11] 4,270,676
[45] Jun. 2, 1981

[54] FEED DISTRIBUTORS

[75] Inventor: Basil W. Green, Boksburg, South Africa

[73] Assignee: Fraser & Chalmers Equipment Limited, Johannesburg, South Africa

[21] Appl. No.: 48,774

[22] Filed: Jun. 15, 1979

[30] Foreign Application Priority Data

Jun. 16, 1978 [ZA] South Africa .................. 78/3467

[51] Int. Cl.³ .................................. B28C 5/04
[52] U.S. Cl. .................................. 222/485
[58] Field of Search ............. 366/336, 337, 338, 341, 366/9; 222/485, 564

[56] References Cited

U.S. PATENT DOCUMENTS

| | | | |
|---|---|---|---|
| 722,782 | 3/1903 | Weaver | 366/9 X |
| 1,066,772 | 7/1913 | Williams | 366/9 |
| 1,072,143 | 9/1913 | Mills et al. | 366/9 |
| 1,884,423 | 10/1932 | Walker | 366/9 |
| 2,907,501 | 10/1959 | Laird | 222/564 X |
| 2,959,329 | 11/1960 | Jensen | 222/485 X |

*Primary Examiner*—Stanley H. Tollberg
*Attorney, Agent, or Firm*—Cushman, Darby & Cushman

[57] ABSTRACT

A feedwell comprises two parallel circular channels side by side or superimposed. In the case of side by side channels they have apertures in their floors and device is provided for adjusting the sizes of the apertures. When the channels are superimposed, the apertures face radially inwardly and also have a device for adjusting their sizes. In the case of two side by side channels downward flow below the apertures is baffled by two series of superimposed and spaced apart baffle plates of different angularity to the radii of the feedwell.

5 Claims, 7 Drawing Figures

FIG. 4
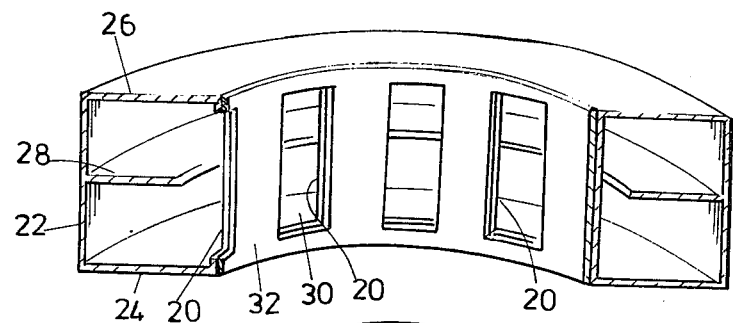
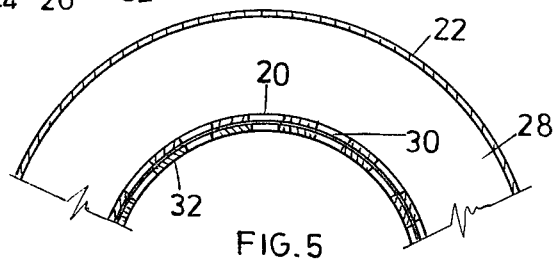
FIG. 5
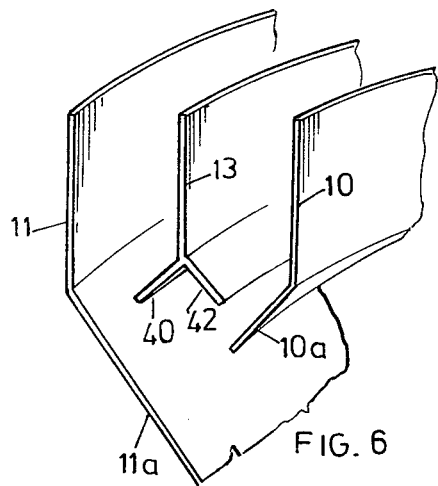
FIG. 6
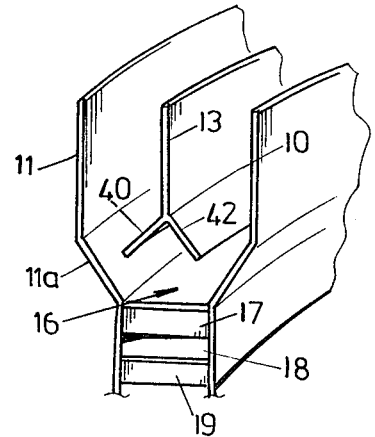
FIG. 7

FEED DISTRIBUTORS

BACKGROUND OF THE INVENTION

This invention relates to feed distributors of the kind in which liquids with solids in suspension e.g. a slurry, are fed to devices such as thickeners, settling tanks and clarifiers.

While not restricted to thickeners, the invention has particular application to them.

Typically a thickener is fed from a central well which in small units is basically an annulus. With large diameter thickeners, where the depth does not increase in proportion to diameter, it is not possible to obtain an even feed with a standard feedwell. In order to obviate some of the problems of larger diameter feedwells a so-called "Fitch feedwell" has been introduced. While the latter gives good mixing of the incoming feed in thickeners up to a certain diameter, it is thought that it would not give an even feed in large diameter thickeners due to the fact that the Fitch feedwell could develop silt deposits in some circumferential zones and cause segregation of the feed solids.

The tendency to cause silt deposits is aggravated during startup when the feed is invariably at a lower rate than during eventual use. Also if the feed rate fluctuates, silting problems may arise.

Obviously there is a need for a feed distributor which can ameliorate the silting problem.

SUMMARY OF THE INVENTION

According to the invention a slurry feed distributor comprises at least one channel extending along a zone of distribution, at least one aperture along the length of the channel from which slurry fed along the channel flows into the zone, and means for adjusting the size of the opening of the aperture.

In one form of the invention there is a series of adjustable apertures. The number and size of the apertures are such that in normal operation flow from the channel extends over the whole length of the channel. The adjustment is preferably from fully closed to fully open so that any flow rate other than the normal level can be accommodated while ensuring flow along the entire length of the channel.

In another form of the invention there is a single, annular, variable aperture only for the channel.

Further according to the invention two channels with adjustable apertures are provided side by side with feed arranged to be in opposite directions in the two channels and flow from the channels being to a common zone.

The invention also provides a development that flow from the or both channels be baffled to ensure quiescent flow into the zone.

As applied to thickeners ad the like circular apparatus, the invention provides that the channel or channels be annular and situated at the center of the thickener and that flow from the channel or channels be gravity assisted or assisted by centrifugal force.

The invention also provides a method of feeding a slurry from a supply to a distribution zone comprising the steps of feeding the slurry along an apertured channel for the slurry to flow to the zone along the length of the channel, and varying the aperture to achieve optimum flow in the channel and optimum distribution in the zone.

BRIEF DESCRIPTION OF THE DRAWINGS

FIG. 4 is a fragmentary schematic perspective view of the invention applied to a Fitch feedwell, FIG. 5 shows schematically on a reduced scale a plan view of the feedwell of FIG. 4, FIG. 6 is a schematic fragmentary view of another variant of the invention, and FIG. 7 is yet another variant of the invention.

DESCRIPTION OF PREFERRED EMBODIMENTS

Figure 1:
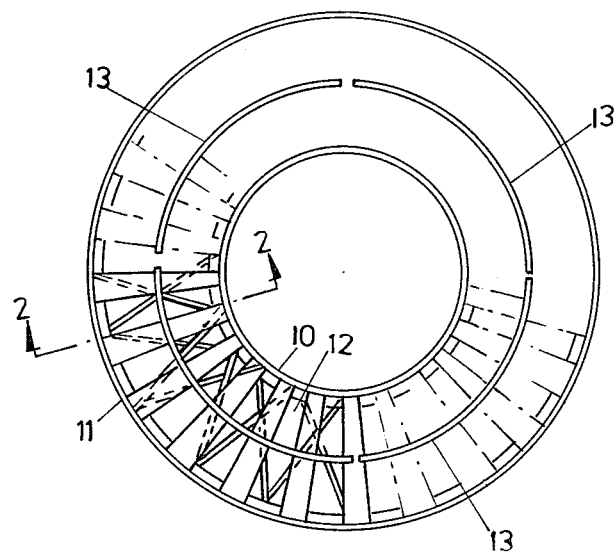
FIG. 1 is a schematic plan view of a feedwell according to the invention.
Figure 2:
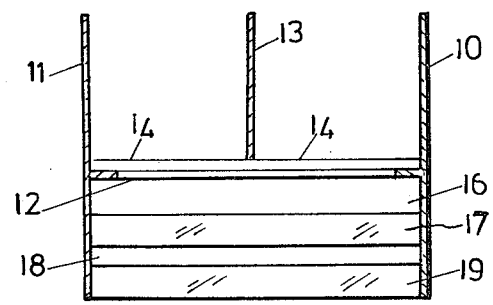
FIG. 2 is a section along the line 2—2 in FIG. 1 on an enlarged scale.
Figure 3:
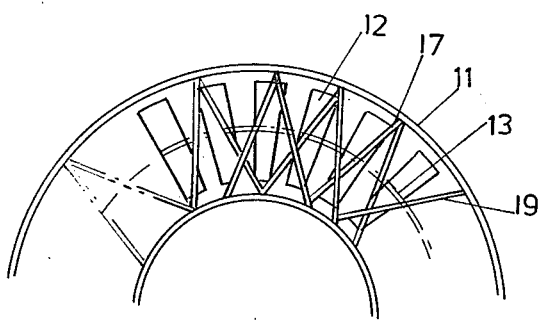
FIG. 3 is a fragmentary underplan of FIG. 1.

The illustrated feedwell of FIGS. 1 to 3 has an inner wall 10 adapted to surround the central drive shaft, support column or caisson of a thickener and an outer wall 11. Extending between the walls 10 and 11 is a floor 12 with two concentric rows of radial apertures.

A series of (in the illustrated embodiment, four) partitions 13 divide the channel between the walls 10 and 11 above the apertured floor into two substantially equal area in plan flow channels. The partitions 13 are each formed with apertured side or radial flanges 14 which serve as shutters to the apertures 12.

By moving the partitions 13 around the centre of the feedwell, manually or by means not shown, it is possible to adjust the apertures 12 between fully closed and fully open positions.

There are thus two concentric channels formed above the apertured floor 12. These channels are fed in a known manner by means of a split feeder so that liquid circulates in them in opposite directions.

Liquid with suspended solids passing through the apertures 12 reaches a mixing zone 16 (FIG. 2) and then a first series of deflection baffles 17, another mixing zone 18 and finally another series of baffles 19. As can be seen from FIG. 3 the baffles 17 and 19 cross one another in plan view. The direction of the baffles is such that they dampen any residual circular component of motion in the slurry passing through apertures 12. Preferably gentle vortices, eddies and cross-currents are formed in the mixing zones 16 and 18 and between baffles 17 and 19 for good mixing as explained further below.

In use, the openings of the apertures 12 are at first set so that they are relatively small in order to accommodate the low feed rate normally associated with start-up, thus ensuring that the feed is carried and distributed evenly all the way around in each channel. Accordingly, zones or regions of silt deposits are prevented. As the feed rate is increased, the apertures are opened more and more to maintain an even and desirable feed distribution all round to the point when normal operating conditions are reached. If for any reason the feed rate varies over any extended period of time, the apertures 12 can be adjusted to accommodate the new varied feed rate.

In thickening applications, such as used in mining operations, single or multiple component flocculents are normally added far upstream of the feedwell in a feed launder where the flocculent is mixed with the feed. With "delicate" flocs and conventional apparatus some of these are destroyed by the violent actions occurring in a "drop-box" or splitter in the main launder ahead of the feedwell. However, with this invention the problem of dealing with "delicate" flocs can be mitigated in that it is envisaged that there will be good mixing and distribution of the flocs in the mixing zones 16, 18 and baffle zones 17, 19 so that the splitter or drop-box can be dispensed with whereby the floc will always be treated "gently". Moreover, because of the envisaged good mixing and distribution it is contemplated that the flocculents can be added directly to the swirling feed in the feedwell. This shows up another advantage of the invention in that the conventionally required drop-box can now be omitted to provide an overall saving in cost.

FIGS. 4 and 5 show the application of the invention to a "Fitch feedwell" as mentioned in the introduction of the specification. The feedwell includes an inner wall 20, an outer wall 22, a floor 24, a roof 26 and a partition 28 which divides the feedwell into two concentric, vertically aligned channels that are in partial communication with each other. The inner wall is formed with circumferential apertures 30 through which feed can pass to a central distribution zone. A cylinder 32 formed with circumferential apertures 34 is provided inside the wall 20 and mounted for rotation so that the degree of opening of the apertures 30 can be controlled. The floor 24 and partition 28 could be sloped radially inwardly further to mitigate the formation of silt deposits at low feed rates.

In practice, feed is supplied to the feedwell so that it flows in countercurrent in the two channels, say clockwise in the upper channel and anti-clockwise in the lower channel. As before with the variant of FIGS. 1 to 3, at start-up the apertures 30 are closed or slightly open and then as the feed rate is increased the apertures 30 are opened until normal operation is achieved. During eventual operation the apertures 30 may be varied to maintain optimum feed conditions when the feed supply is varied. Clearly an operational Fitch feedwell may be modified to achieve the advantages of the invention.

FIG. 6 shows a variant of feedwell of the invention which has some similarity with that of FIGS. 1 to 3 with the difference that instead of a series of variable apertures 12, there are two annular variable apertures, one for each channel. The feedwell includes an inner wall 10, an outer wall 11 and a partition 13 from which depend two inclined annular flanges 40 and 42. The partition 13 is movable vertically by suitable means, not shown, so that the opening between flange 40 and skirt 11a and flange 42 and skirt 10a can be varied.

FIG. 7 shows a development of the variant of FIG. 6, in which an annular trough 44 is formed below the skirts 10a and 11a to form a mixer similar to that shown in FIG. 2 with series of baffles 17 and 19 and mixing zones 16 and 18.

I claim:

1. A slurry feed distributor for sedimentation apparatus comprising two annular channels extending around a zone of distribution, at least one aperture along the length of each channel from which slurry fed along the channel flows into the zone, means to feed slurry into the two channels in opposite directions, and means for adjusting the size of the opening of each aperture.

2. The feed distributor claimed in claim 1 in which there are a series of simultaneously adjustable apertures along the length of each channel.

3. The feed distributor claimed in claim 1 in which there is a single aperture co-extensive with the length of each channel.

4. The feed distributor claimed in claim 1 in which the flow to the zone from each channel is baffled to ensure quiescent flow into the zone.

5. The feed distributor claimed in claim 1 in which the means for adjusting each aperture opening varies the opening from fully closed to fully open.

* * * * *